(12) United States Patent
Nakashima

(10) Patent No.: US 8,253,846 B2
(45) Date of Patent: Aug. 28, 2012

(54) PICTURE SIGNAL PROCESSING CIRCUIT, SIGNAL PROCESSING METHOD, IMAGING APPARATUS, DISPLAY DEVICE, AND CAMERA SYSTEM

(75) Inventor: Yasutaka Nakashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 12/618,873

(22) Filed: Nov. 16, 2009

(65) Prior Publication Data

US 2010/0123808 A1      May 20, 2010

(30) Foreign Application Priority Data

Nov. 18, 2008  (JP) ................. P2008-294878

(51) Int. Cl.
*H04N 5/232* (2006.01)
*H04N 5/222* (2006.01)
(52) U.S. Cl. .................. 348/345; 348/333.11
(58) Field of Classification Search .................. 348/345, 348/333.11
See application file for complete search history.

(56) References Cited

U.S. PATENT DOCUMENTS 7,719,605 B2 *   5/2010   Hirasawa et al. ............. 348/345

FOREIGN PATENT DOCUMENTS

| JP | 6 292229 | 10/1994 |
|----|----------|---------|
| JP | 11 298791 | 10/1999 |
| JP | 11 341315 | 12/1999 |
| JP | 2000 224473 | 8/2000 |
| JP | 2005 150964 | 6/2005 |
| JP | 2005 191702 | 7/2005 |

* cited by examiner

*Primary Examiner* — James Hannett
(74) *Attorney, Agent, or Firm* — Frommer Lawrence & Haug LLP; William S. Frommer

(57) ABSTRACT

A picture signal processing circuit includes a filter unit, a memory and a main control unit. When a display operates in a first display mode, the filter unit removes high-frequency components from first picture signals supplied in a first picture size from an imaging device, to provide second picture signals. When the display operates in a second display mode, the picture signals are provided unchanged. The memory stores the first and second picture signals, reads out the second picture signals, changes the second picture signals from a first picture size to a second picture size and supplies those second picture signals to the display when the display operates in the first display mode. The first picture signals corresponding to a picture clipped from the first picture size to the second picture size are read out to the display when the display operates in the second display mode. The main control unit controls switching between the first picture signals and the second picture signals from the memory according to whether the first or second display mode is selected.

12 Claims, 7 Drawing Sheets

INTERNAL CONFIGURATION EXAMPLE OF IMAGING APPARATUS

EXTERNAL CONFIGURATION EXAMPLE OF IMAGING APPARATUS

INTERNAL CONFIGURATION EXAMPLE OF IMAGING APPARATUS

INTERNAL CONFIGURATION EXAMPLE OF DISPLAY SIGNAL PROCESSING UNIT

FIRST CONFIGURATION EXAMPLE OF FILTER UNIT

SECOND CONFIGURATION EXAMPLE OF FILTER UNIT

EXAMPLE OF PICTURE SIGNAL OUTPUT BY FILTER UNIT

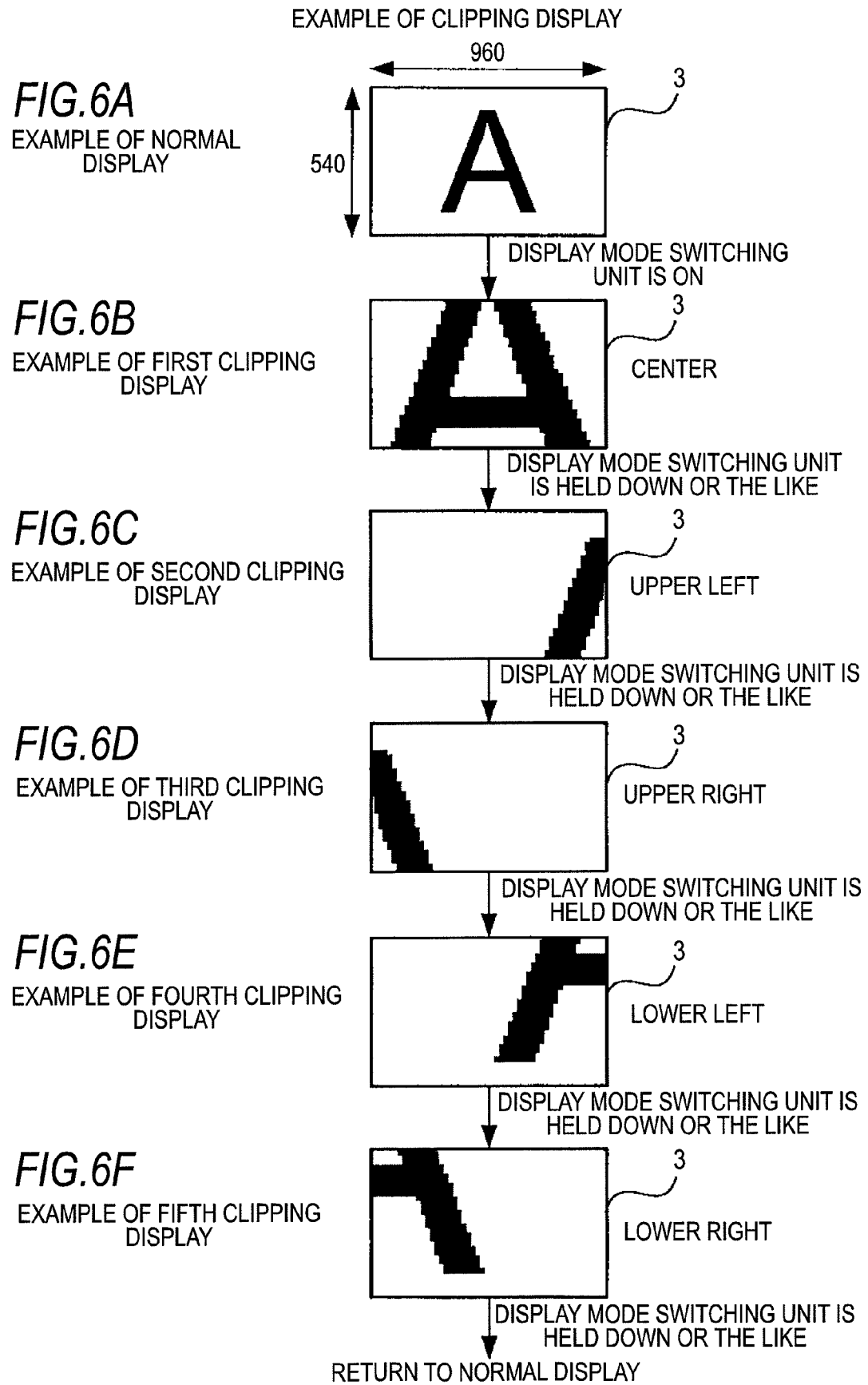

CONFIGURATION EXAMPLE OF CAMERA SYSTEM

CONFIGURATION EXAMPLE OF FIRST CAMERA SYSTEM

CONFIGURATION EXAMPLE OF SECOND CAMERA SYSTEM

CONFIGURATION EXAMPLE OF THIRD CAMERA SYSTEM

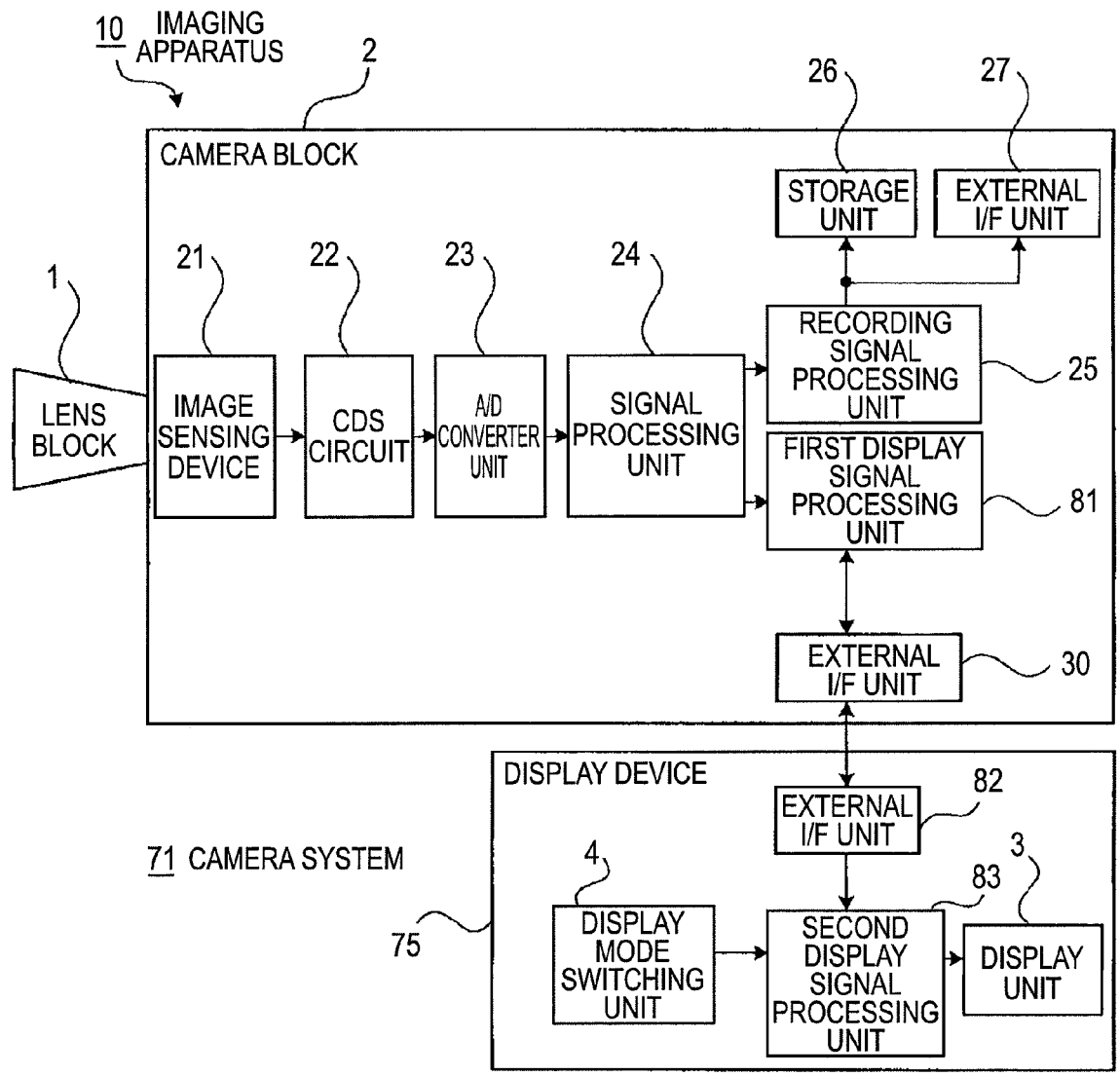

INTERNAL CONFIGURATION EXAMPLE OF SECOND DISPLAY SIGNAL PROCESSING UNIT

EXAMPLE OF NUMBER OF PIXELS OF PICTURE SIZE IMAGED BY IMAGING APPARATUS

EXAMPLE OF NUMBER OF PIXELS OF PICTURE SIZE DISPLAYED ON VIEWFINDER MONITOR

EXAMPLE OF PICTURE DISPLAYED ON VIEWFINDER MONITOR IN THE PAST

PICTURE SIGNAL PROCESSING CIRCUIT, SIGNAL PROCESSING METHOD, IMAGING APPARATUS, DISPLAY DEVICE, AND CAMERA SYSTEM

BACKGROUND OF THE INVENTION

1. Field of the Invention

The present invention relates to a picture signal processing circuit, a picture signal processing method, an imaging apparatus, a display device, and a camera system that are preferable when they are applied to the case of imaging high-resolution pictures, for example.

2. Background Art

Recently, with improvements in performance of imaging devices such as imaging sensors, the number of pixels in pictures imaged using an imaging apparatus such as a video camera or a still camera has been increased. Typically, a photographer brings a subject into focus while looking into a small viewfinder monitor provided on or connected to the imaging apparatus, and takes an image of the subject. However, since the display range of the viewfinder monitor is small, the number of displayed pixels of the viewfinder monitor is smaller than the number of effective pixels of the imaging device. Accordingly, for display of pictures on the viewfinder monitor, the number of pixels of the pictures supplied from the imaging device has been down-converted into the number of pixels that the viewfinder monitor can display.

FIGS. 10A and 10B show examples of pictures displayed on a viewfinder monitor in the past.

FIG. 10A shows an example of picture size that an imaging apparatus can image.

The imaging apparatus in this example can image a picture having a picture size of 1920×1080 pixels based on HD (High-Definition) standards.

FIG. 10B shows an example of a picture displayed on the viewfinder monitor.

The viewfinder monitor can display a picture in picture size of 960×540 pixels, and the picture size of the viewfinder monitor is only a quarter of the picture size (1920×1080 pixels) of the picture that the imaging apparatus shown in FIG. 10A can image. Accordingly, the viewfinder monitor is not able to display the picture unless the picture size of the picture imaged in HD (1920×1080 pixels) is reduced to the picture size of 960×540 pixels. The reducing processing of the picture size is performed by thinning pixels of the picture imaged in the imaging apparatus or using various kinds of filters on the picture signals. For example, when a typical digital filter is used, processing of filtering of (1,1) is performed on the picture signals.

JP-A-2005-191702 discloses a technology related to a viewfinder monitor attached to the imaging apparatus.

SUMMARY OF THE INVENTION

As described above, when a picture is displayed on the viewfinder monitor, processing of reducing the number of the imaged picture is performed. Accordingly, only by viewing the viewfinder monitor, it may be impossible to confirm the picture in original resolution that has been imaged by the imaging apparatus and the frequency of picture signals. Therefore, it becomes difficult to bring the subject into focus and confirm the subject in focus, and focus accuracy becomes lower.

Further, the situation that the subject is out of focus is found when the picture is checked on the monitor that can display the picture imaged by the imaging apparatus in original resolution. Accordingly, only a low-resolution picture has been obtained despite that the imaging apparatus that can perform high-resolution imaging.

Thus, it is desirable that a user can easily bring a subject into focus when imaging a high-resolution picture.

According to an embodiment of the invention, based on first picture signals supplied from an imaging device that images a subject in a first picture size determined by a first number of pixels, a first or second display mode for display of a picture on a display unit having a picture size determined by a second number of pixels smaller than the first number of pixels is set.

Then, second picture signals obtained by performing filter processing of removing high-frequency components from the first picture signals are output in the first display mode, and the first picture signals without change are output in the second display mode.

Then, a memory is allowed to store the first or second picture signals, and the second picture signals are read out from the memory, processing of reducing from the first picture size to the second picture size is performed on the second picture signals, and output to the display unit in the first display mode.

The first picture signals corresponding to a picture clipped in the second picture size from the picture in the first picture size are read out from the memory and output to the display unit in the second display mode.

Then, switching between the first and second picture signals filter-processed or read out from the memory is controlled according to a command of switching between the first and second display modes provided by a display mode switching unit that provides the command of switching between the first and second display modes.

In this manner, different picture signals depending on the first or second display mode commanded to be switched are output to the display unit, and pictures can be displayed according to the resolution of the display unit in the second display mode.

According to the embodiment of the invention, different picture signals depending on the first or second display mode are output to the display unit and pictures are displayed according to the resolution of the display unit in the second display mode, and thereby, the subject is easily brought into focus. Accordingly, there is an advantage that the subject can be imaged with high resolution.

BRIEF DESCRIPTION OF THE DRAWINGS

FIGS. 6A to 6F are explanatory diagrams showing examples of clipping display of a picture displayed on a display unit according to the first embodiment of the invention.

FIG. 8 is a block diagram showing an internal configuration example of the camera system according to the second embodiment of the invention.

DESCRIPTION OF PREFERRED EMBODIMENTS

As below, best modes (hereinafter, referred to as embodiments) for implementing the invention will be explained. The explanation will be made in the following order.

1. First Embodiment (Configuration example and operation example of imaging apparatus)
2. Second Embodiment (Configuration example of camera system)
3. Third Embodiment (Configuration example and operation example of second display signal processing unit)
4. Modified Examples

1. First Embodiment

External Configuration Example of Imaging Apparatus

Figure 1:
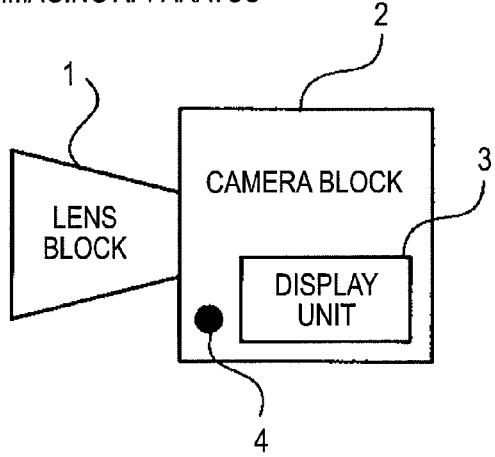
FIG. 1 is a block diagram showing an external configuration example of an imaging apparatus according to a first embodiment of the invention.

FIG. 1 shows an external configuration example of an imaging apparatus 10 having a display device.

The imaging apparatus 10 includes an optical system having a lens, a shutter, etc., and has a lens block 1 that takes subject light into the imaging apparatus 10, and a camera block 2 that generates picture signals from the subject light entering via the lens block 1. Further, the imaging apparatus 10 includes a display unit 3 that displays a picture based on the picture signals generated by the camera block 2 and a display mode switching unit 4 that switches the display mode of the picture to be displayed on the display unit 3 to the first or second display mode. Furthermore, the imaging apparatus 10 includes a display signal processing unit 28, which will be described later, as a picture signal processing circuit.

The camera block 2 includes an imaging device 21, which will be described later, and the picture size in which the imaging device 21 can image the subject (hereinafter, referred to as "the first picture size") is determined depending on the first number of pixels. On the other hand, in the number of pixels of the display unit 3, the picture can be displayed in the picture size determined by the second number of pixels smaller than the first number of pixels (hereinafter, referred to as "the second picture size").

The lens block 1 contains a lens, a focus ring for adjustment of the position of the lens (both are not shown), etc. The display mode switching unit 4 is contained in an operation part having a switch, a button, a button of UI (User Interface) displayed on a touch panel (not shown), or the like.

Figure 10A:
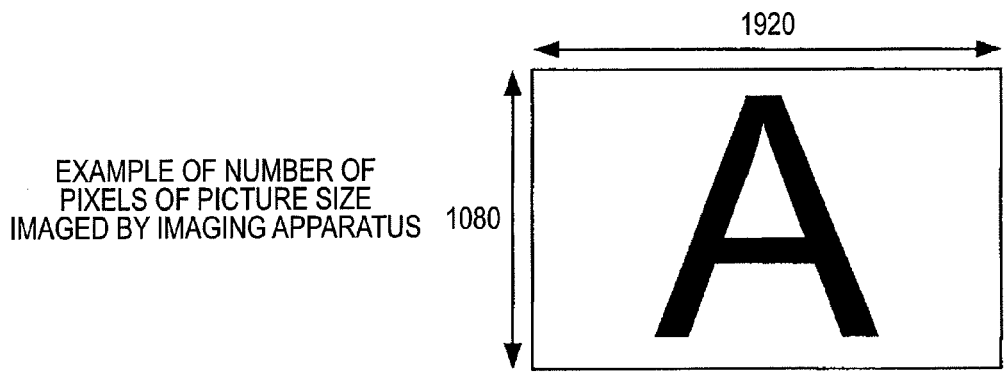
FIGS. 10A and 10B are explanatory diagrams showing examples of subject pictures displayed on a viewfinder monitor in the past.
Figure 10B:
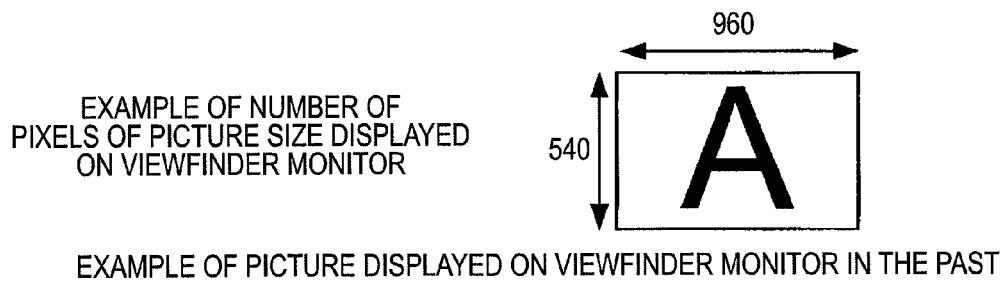

Hereinafter, display of a picture in the first display mode is referred to as "normal display" and display of a picture in the second display mode is referred to as "clipping display". An example of the normal display in which a picture imaged by the imaging device is reduced and the entire picture is displayed on the display unit 3 has been shown in FIG. 10B. On the other hand, an example of the clipping display will be shown in FIGS. 6A to 6F, which will be described later.

[Internal Configuration Example of Imaging Apparatus]

Figure 2:
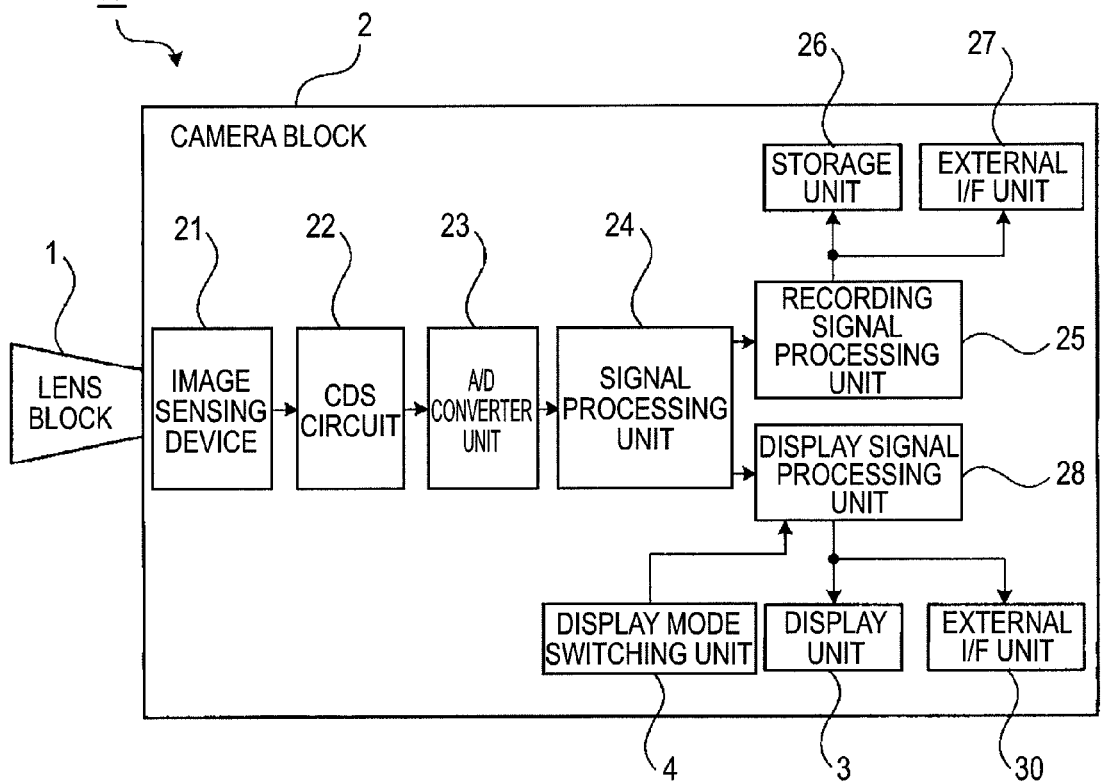
FIG. 2 is a block diagram showing an internal configuration example of a camera system according to the first embodiment of the invention.

FIG. 2 shows an internal configuration example of the imaging apparatus 10 according to the first embodiment of the invention.

The camera block 2 includes the imaging device 21 that photoelectrically converts the subject light entering via the lens of the lens block 1 and generates picture signals. The picture signals supplied from the imaging device 21 (hereinafter, referred to as "first picture signals") are supplied to a correlated double sampling (CDS) circuit 22. The correlated double sampling circuit 22 removes reset noise contained in the first picture signals and supplies the picture signals after noise removal to an analog/digital converter unit 23.

The analog/digital converter unit 23 converts the first picture signals supplied from the correlated double sampling circuit 22 into digital signals and supplies them to a signal processing unit 24. The signal processing unit 24 performs feedback clamp processing for fixing the black level to a certain standard value and signal processing such as gamma correction on the input first picture signals, and outputs them to a recording signal processing unit 25 and the display signal processing unit 28.

The recording signal processing unit 25 compresses the first picture signals signal-processed by the signal processing unit 24 in a method of MPEG (Moving Picture Experts Group) or the like, and outputs them in progressive to a storage unit 26 or an external interface unit 27. The storage unit 26 includes an HDD (Hard Disk Drive), a semiconductor memory, or the like, and accumulates the first picture signals compressed by the recording signal processing unit 25 and the like. Note that the storage unit 26 may accumulate uncompressed first picture signals.

The display signal processing unit 28 encodes the first picture signals signal-processed by the signal processing unit 24 in a method of NTSC (Near Field Communication) or the like. Then, the unit performs processing of converting the encoded picture signals into analog signals and the like, and interlace-outputs them to the display unit 3 and an external interface unit 30. Note that the method of encoding the first picture signals may be another method of PAL (Phase Alternating Line) or the like. Further, the first picture signals input to the display signal processing unit 28 may be not only standard video signals or HD (High Definition) signals. Furthermore, when the off-state display mode switching unit 4 is switched into on-state, the display signal processing unit 28 in this example switches from the first display mode to the second display mode. Specifically, the unit performs processing of switching the pictures displayed on the display unit 3 from the normal display to the clipping display. The specific configuration example and operation example of the display signal processing unit 28 will be described later.

The display unit 3 is a viewfinder monitor including an LCD (Liquid Crystal Display) or the like, for example, and displays the picture signals processed by the display signal processing unit 28 as a picture in monochrome or color. In this example, the display unit 3 is integrally attached to the imaging apparatus 10, and a photographer brings a subject into focus while viewing the picture shown on the display unit 3 and takes a picture.

Figure 3:
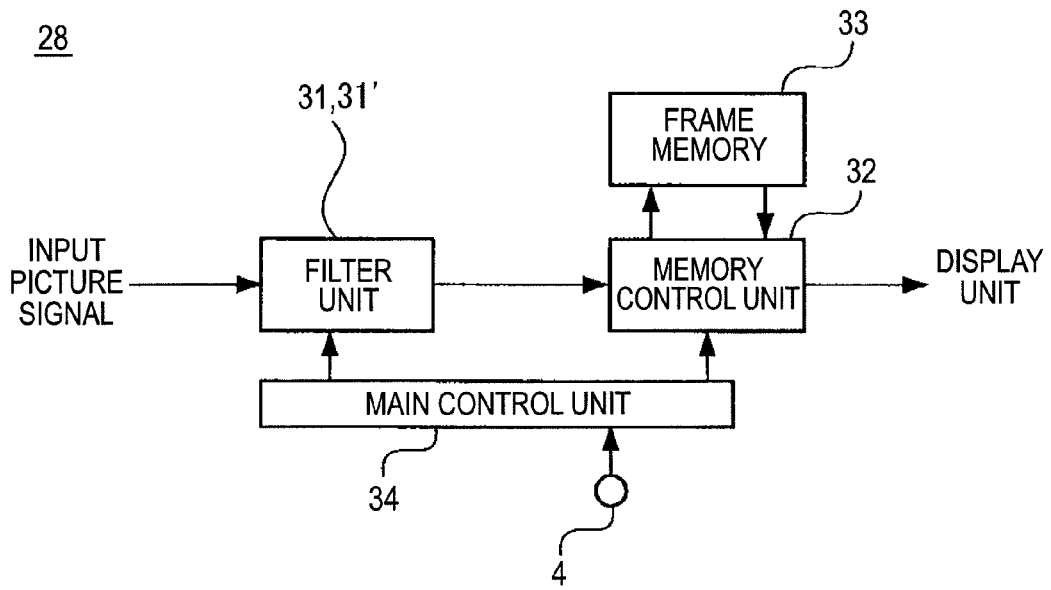
FIG. 3 is a block diagram showing an internal configuration example of a display signal processing unit according to the first embodiment of the invention.

FIG. 3 shows an internal configuration example of the display signal processing unit 28.

The display signal processing unit 28 includes a filter unit 31 that outputs picture signals obtained by performing predetermined filter processing on the first picture signals input from the signals processing unit 24 (hereinafter, referred to as "second picture signals") in the first display mode. Note that, in the second display mode, the filter unit 31 outputs the first picture signals without performing filter processing thereon. Further, the display signal processing unit 28 includes a memory control unit 32 that temporarily stores the first or second picture signals that has passed through the filter unit 31 in a frame memory 33, and reads out the first or second picture signals from the frame memory 33 and outputs them to the display unit 3. Further, the display signal processing unit 28 includes a main control unit 34 that controls the operation of the filter unit 31 and the memory control unit 32 according to the first or second display mode. The frame memory 33 is a memory that stores picture signals with respect to one frame, and a DRAM (Dynamic Random Access Memory) is typically used therefor.

In the following description, the display signal processing unit 28 may include a filter unit 31' having a different internal configuration from that of the filter unit 31, and the filter unit 31' will be explained with reference to FIG. 4B.

The filter unit 31 outputs the second picture signals obtained by performing filter processing except high-frequency components on the first picture signals input from the signal processing unit 24 in the first display mode. On the other hand, the unit outputs the first picture signals without change in the second display mode.

The main control unit 34 controls switching between the first and second picture signals filter-processed or read out from the frame memory 33 by the memory control unit 32 according to a command of switching the display mode commanded by the display mode switching unit 4. Specifically, the unit changes the filter coefficient of the filter unit 31 or changes the first or second picture signals read out from the frame memory 33 by the memory control unit 32.

In the first display mode, the main control unit 34 sets the filter unit 31 to have an effective filter coefficient and allows the memory control unit 32 to output the second picture signals obtained by performing filter processing on the first picture signals. Simultaneously, the memory control unit 32 allows the frame memory 33 to temporarily store the input second picture signals. Then, the unit reads out the second picture signals from the frame memory 33, performs thinning processing for reduction from the first picture size to the second picture size on the second picture signals, and outputs them to the display unit 3.

On the other hand, in the second display mode, the main control unit 34 sets the filter coefficient of the filter unit 31 to an ineffective value, and, without filtering processing, allows the memory control unit 32 to output the first picture signals. Simultaneously, the memory control unit 32 allows the frame memory 33 to temporarily store the input first picture signals. Then, the unit reads out the first picture signals corresponding to the picture clipped in the second picture size from the picture in the first picture size from the frame memory 33, and outputs them to the display unit 3.

Concurrently, the memory control unit 32 reads out the first picture signals corresponding to the picture in the second picture size for which a clipping position in the picture in the first picture size has been selected according to the command of the display mode switching unit 4 commanded by the photographer from the frame memory 33. Then, the unit outputs the first picture signals to the display unit 3.

Figure 4A:
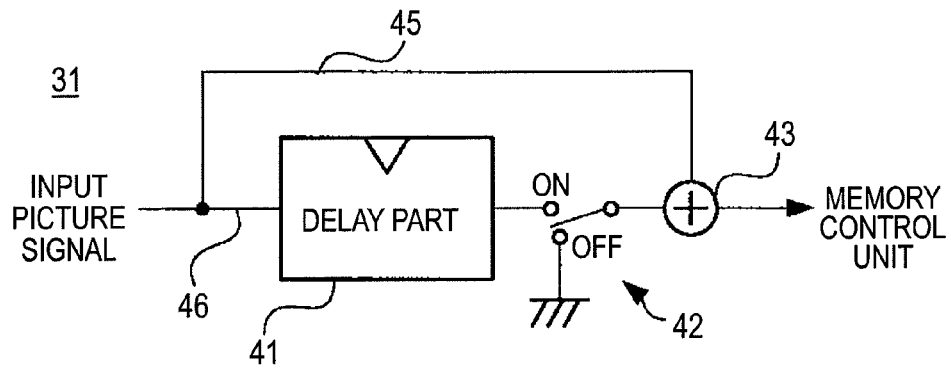
FIGS. 4A and 4B are block diagrams showing internal configuration examples of filter units according to the first embodiment of the invention.
Figure 4B:
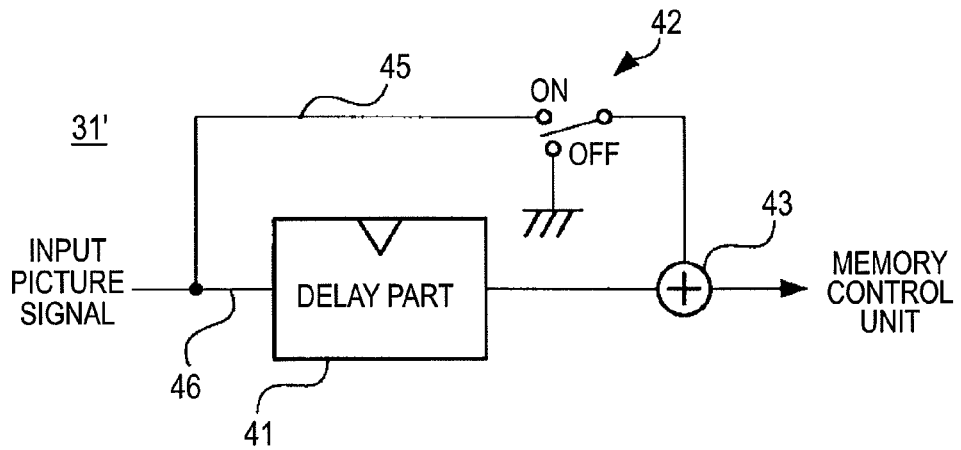

FIGS. 4A and 4B show internal configuration examples of the filter units 31, 31'.

FIG. 4A shows the first internal configuration example of the filter unit 31.

The first picture signals input to the filter unit 31 are divided into two paths. The first path 45 transmits the first picture signals without performing any processing on the picture signals. In the second path 46, a delay part 41 that delays the picture signals by one clock and a switch 42 that controls the output of the first picture signals that have been delayed by one clock are provided. Further, the filter unit 31 includes an addition part 43 in which the first picture signals transmitted from the first path 45 and the second path 46 are added. The picture signals output by the addition part 43 are supplied to the memory control unit 32. For the delay part 41, for example, a D-flip-flop is used.

In this example, when the display mode switching unit 4 is turned on, the switch 42 is turned off, and, when the display mode switching unit 4 is turned off, the switch 42 is turned on. When the switch 42 is turned on, the addition part 43 adds the first picture signals and the first picture signals that have passed through the delay unit 41 and delayed by one clock, and outputs them as second picture signals. Accordingly, the resolution of the picture signals output by the addition part 43 is lower than the resolution of the input picture signals. On the other hand, when the switch 42 is turned off, the addition part 43 outputs only the first picture signals transmitted from the first path 45 to the memory control unit 32. Accordingly, the resolution of the picture signals output by the addition part 43 is the same as the resolution of the input picture signals.

FIG. 4B shows the second internal configuration example of the filter unit 31'.

The first picture signals input to the filter unit 31' are divided into two paths. In the first path 45, a switch 42 that controls the output of the first picture signals is provided. In the second path 46, a delay part 41 that delays the first picture signals by one clock and outputs them is provided. Further, the filter unit 31' includes an addition part 43 in which the first picture signals transmitted from the first path 45 and the second path 46 are added. The picture signals output by the addition part 43 are supplied to the memory control unit 32. For the delay part 41, for example, a D-flip-flop is used.

In this example, when the display mode switching unit 4 is turned on, the switch 42 is turned off, and, when the display mode switching unit 4 is turned off, the switch 42 is turned on. When the switch 42 is turned on, the addition part 43 adds the first picture signals and the first picture signals that have passed through the delay unit 41 and delayed by one clock, and outputs them as second picture signals. Accordingly, the resolution of the picture signals output by the addition part 43 is lower than the resolution of the input picture signals. On the other hand, when the switch 42 is turned off, the addition part 43 outputs only the first picture signals transmitted from the second path 46 to the memory control unit 32. Accordingly, the resolution of the picture signals output by the addition part 43 is the same as the resolution of the input picture signals, but the signals are delayed by one clock.

Figure 5:
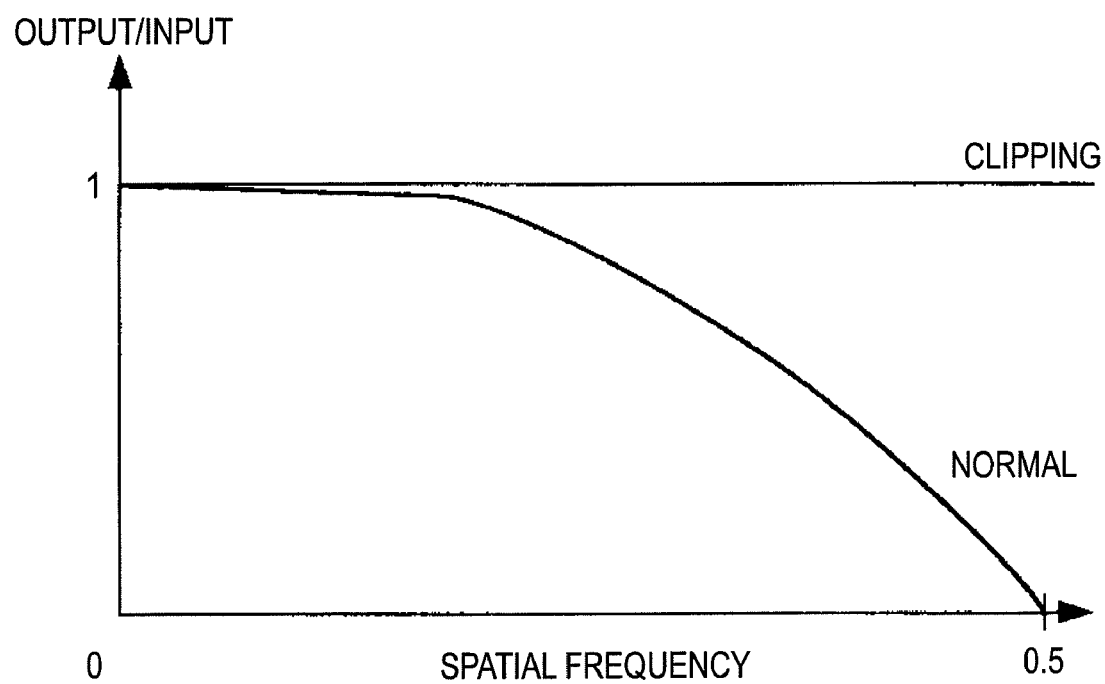
FIG. 5 is an explanatory diagram showing an example of a picture signal output by the filter unit according to the first embodiment of the invention.

FIG. 5 shows an example of a picture signal output by the filter units 31, 31'.

The vertical axis of the graph shown in FIG. 5 indicates a ratio of output to input of the picture signal, and the horizontal axis indicates a spatial frequency (Fs). The filter units 31, 31' are designed to maintain the amplitude when the spatial frequency is low, attenuate the signals as the spatial frequency becomes higher, and set the amplitude to zero when the spatial frequency is 0.5 Fs.

FIGS. 6A to 6F show examples of normal display and clipping display of a picture displayed on the display unit 3 and display examples of the picture for which clipping positions are switched.

The display unit 3 in this example displays the picture in size of 960×540 pixels. Note that the examples of clipping display in these examples are just examples and it is necessary to change the way of clipping and the clipping position of the picture according to the relationship between the number of pixels before clipping (the number of imaged, recorded, or transmitted pixels of the imaging apparatus) and the number of pixels of the display unit 3.

FIG. 6A shows an example of a pixel in normal display on the display unit 3.

At this time, the display mode switching unit 4 is off. On the display unit 3, the picture signals generated by the imaging device 21 are thinned, and the entire picture is reduced and displayed. In this manner, in the case of normal display, scaling by the frame memory 33 is performed.

FIG. 6B shows an example of the first clipping display displayed on the display unit 3.

When a user pushes and holds the display mode switching unit 4 in a predetermined time, a command switching from the first display mode to the second display mode is provided to the main control unit 34, and the clipped picture is displayed on the display unit 3. The picture is a picture near the center in the first picture size enlarged to the same resolution as that of the picture imaged, recorded, and transmitted in the imaging apparatus 10. At the same time, the memory control unit 32 reads out the first picture signals corresponding to the picture clipped in the second picture size from the picture in the first picture size from the frame memory 33. The first picture signals read out from the frame memory 33 by the memory control unit 32 correspond to the picture having the center point of a horizontal line and a vertical line in the second picture size superimposed on the center point of a horizontal line and a vertical line in the first picture size.

In this manner, in the second display mode, the picture is displayed on the display unit 3 by the first picture signals that have not been filter-processed.

FIG. 6C shows an example of the second clipping display displayed on the display unit 3.

In the state shown in FIG. 6B (in the second display mode), when the user further holds down the display mode switching unit 4 in a time more than the predetermined time, a command of switching the picture displayed on the display unit 3 is provided to the main control unit 34. At each time when the command of switching the picture is provided, the memory control unit 32 changes the position of the picture in the second picture size clipped in the picture of the first picture size, and the picture displayed on the display unit 3 is switched to the picture in the second clipping display. The following operation in the long press is the same. The picture is a picture near the upper left enlarged to the same resolution as that of the picture imaged, recorded, and transmitted in the imaging apparatus 10. As below, the time in which the user holds down the display mode switching unit 4 is one second or more.

FIG. 6D shows an example of the third clipping display displayed on the display unit 3.

In the state shown in FIG. 6C, when the user holds down the display mode switching unit 4, the picture displayed on the display unit 3 is switched to the picture in the third clipping display. The picture is a picture near the upper right enlarged to the same resolution as that of the picture imaged, recorded, and transmitted in the imaging apparatus 10.

FIG. 6E shows an example of the fourth clipping display displayed on the display unit 3.

In the state shown in FIG. 6D, when the user holds down the display mode switching unit 4, the picture displayed on the display unit 3 is switched to the picture in the fourth clipping display. The picture is a picture near the lower left enlarged to the same resolution as that of the picture imaged, recorded, and transmitted in the imaging apparatus 10.

FIG. 6F shows an example of the fifth clipping display displayed on the display unit 3.

In the state shown in FIG. 6E, when the user holds down the display mode switching unit 4, the picture displayed on the display unit 3 is switched to the picture in the fifth clipping display. The picture is a picture near the lower right enlarged to the same resolution as that of the picture imaged, recorded, and transmitted in the imaging apparatus 10. Here, the picture clipped in the second picture size thoroughly clips the picture in the first picture size.

Furthermore, in the state shown in FIG. 6F, when the user holds down the display mode switching unit 4, the memory control unit 32 switches from the second display mode to the first display mode, and the picture displayed on the display unit 3 is switched to normal display. The timing is when the picture clipped in the second picture size thoroughly clips the picture in the first picture size.

Note that, in any case of clapping display (FIGS. 6B to 6E), when the user lightly pushes the display mode switching unit 4 (e.g., for less than one second), a command of switching from the second display mode to the first display mode is provided to the main control unit 34, and the display is returned to normal display (FIG. 6A). Accordingly, the user checks the focus and brings the subject into focus using arbitrary clipping display, and then, immediately returns the display to normal display for continuing shooting.

According to the imaging apparatus 10 according to the first embodiment described above, in the first display mode, all pixels imaged, recorded, and transmitted in the imaging apparatus 10 or all pixels in an effective region are reduced and displayed according to the picture size that the display unit 3 can display. On the other hand, when the subject is brought into focus and whether the subject is in focus is confirmed with high accuracy, the user turns on the display mode switching unit 4 and switches the display into the second display mode. Thereby, the picture displayed on the display unit 3 is in clipping display. Accordingly, the picture partially clipped from all pixels imaged, recorded, and transmitted in the imaging apparatus 10 or all pixels in an effective region are reduced and displayed according to the number of pixels of the display unit 3 can be displayed on the display unit 3. Further, using picture signals having the same frequency components as those of picture signals imaged, recorded, and transmitted in the imaging apparatus 10, the focus can be confirmed by the picture displayed on the display unit 3. Accordingly, when the user desires to confirm the focus or bring the subject into focus, clipping display can be promptly performed.

Note that, at clipping display, for enlarging the picture to be displayed on the display unit 3, it is difficult to display all regions imaged by the imaging apparatus 10 on the display unit 3. Accordingly, in order to cover all display regions, the screen is divided for arbitrary selection. Thereby, in an arbitrary region to be imaged, the user can obtain the focus accuracy equal to that of a monitor having the number of pixels that the imaging apparatus 10 can image.

Further, the user pushes and holds the display mode switching unit 4 or pushes it at several times, and the clipping position is changed so that the picture to be shown in clipping display may cover all pictures imaged, recorded, and transmitted in the imaging apparatus 10. Thereby, all regions in the picture imaged in the imaging apparatus 10 can thoroughly be shown in clipping display.

Furthermore, in the display unit 3 having the smaller number of pixels than the number of pixels that the imaging apparatus 10 can image as well, there is an advantage that the focus accuracy equal to that of a monitor having the number of pixels that the imaging apparatus 10 can image can be obtained. In addition, there is an advantage that it becomes unnecessary to separately prepare a monitor that can display the picture being imaged with original resolution or the like.

Moreover, the frame memory 33 is commonly used for reduced display and enlarged display of pictures. The frame memory is used for normal display of pictures in the first display mode and used for clipping display in the second display mode. Thereby, it is not necessary to provide special frame memories for the respective display modes of normal display and clipping display, and the component elements can be simplified. Accordingly, a picture signal processing circuit inexpensive but with low power consumption can be obtained.

2. Second Embodiment

External Configuration Example of Camera System

Next, the second embodiment according to the invention will be explained with reference to FIGS. 7A to 7C. In the embodiment, an example in which the invention is applied to a camera system that includes the imaging apparatus 10 as a component element will be explained. In the following description, the same signs are assigned to the parts corresponding to those in FIG. 1 that has been already described in the first embodiment and the detailed description thereof will be omitted.

The location where the display mode switching unit 4 is provided may vary depending on the configuration of the camera system. For example, when the display signal processing unit 28 according to the above described first embodiment and the display mode switching unit 4 are apart from each other, the control signal output from the display mode switching unit 4 by a wired or wireless control device is transmitted to the display signal processing unit 28.

[External Configuration Examples of Camera Systems]

Figure 7A:
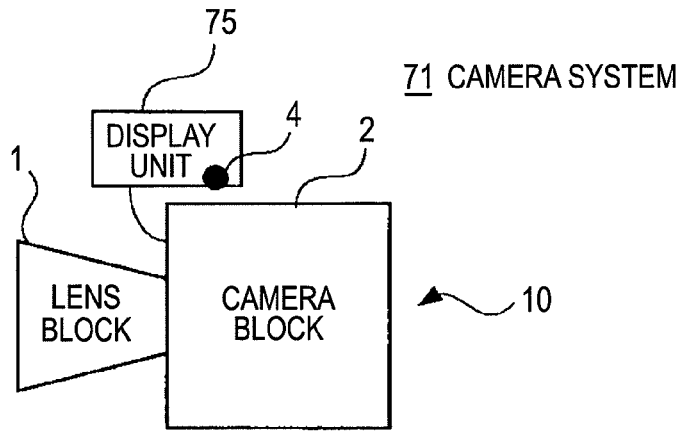
FIGS. 7A to 7C are block diagrams showing external configuration examples of camera systems according to a second embodiment of the invention.
Figure 7B:
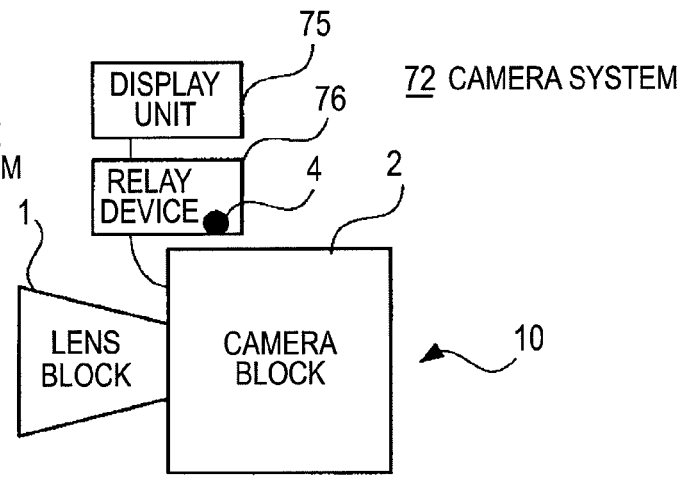
Figure 7C:
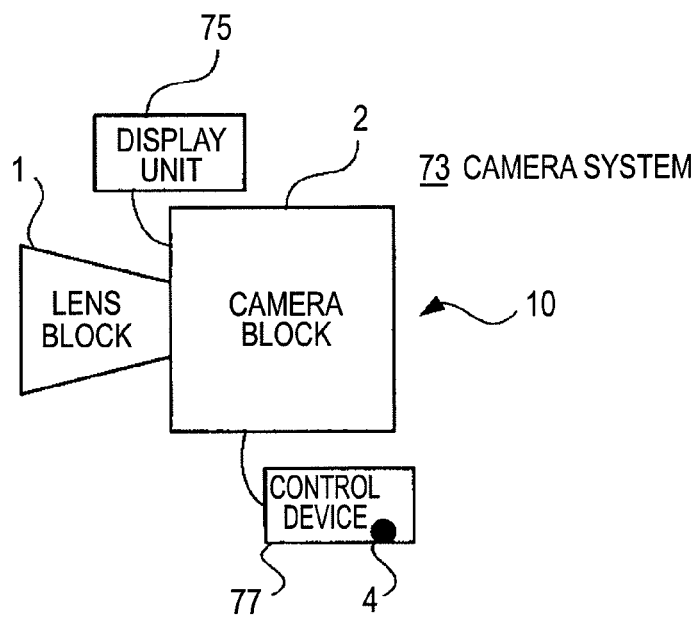

FIGS. 7A to 7C show external configuration examples of the first to third camera systems.

The first camera system 71 shown in FIG. 7A includes an imaging apparatus 10 having a lens block and a camera block 2, and a display device 75 provided outside of the imaging apparatus 10 for use by a user to confirm the focus of a subject. The display device 75 is connected to the imaging apparatus 10, and picture signals are supplied from the imaging apparatus 10 thereto. Further, the display mode switching unit 4 is attached to the display device 75.

FIG. 7B shows an external configuration example of the second camera system.

The second camera system 72 shown in FIG. 7B includes an imaging apparatus 10 having a lens block and a camera block 2, a display device 75 provided outside of the imaging apparatus 10, and a relay device 76 provided between the display device 75 and the imaging apparatus 10 for relaying picture signals. The relay device 76 is connected between the imaging apparatus 10 and the display device 75, and sends the picture signals supplied from the imaging apparatus 10 to the display device 75. Further, the display mode switching unit 4 is attached to the relay device 76.

FIG. 7C shows an external configuration example of the third camera system.

The third camera system 73 shown in FIG. 7C includes an imaging apparatus 10 having a lens block and a camera block 2, a display device 75 provided outside of the imaging apparatus 10, and a control device 77 that controls the operation of the imaging apparatus 10. The display device 75 and the control device 77 are connected to the imaging apparatus 10, and picture signals are supplied from the imaging apparatus 10 thereto. Further, the control device 77 includes the display mode switching unit 4. For the control device 77 in this example, a remote control device that can remotely control the imaging apparatus 10 wirelessly or wiredly.

According to the second embodiment described above, the location where the display mode switching unit 4 is provided is not limited to the imaging apparatus 10, but may be provided in various devices. Therefore, there is an advantage that the user can easily provide a command of switching between the first and second display modes.

3. Third Embodiment

Internal Configuration Example of First Camera System

Next, the third embodiment according to the invention will be explained with reference to FIGS. 8 and 9. In the embodiment, an example in which the invention is applied to the first camera system 71 including the imaging apparatus 10 and the display device 75. In the following description, the same signs are assigned to the parts corresponding to those in FIGS. 1 to 3 that have been already described in the first embodiment and the detailed description thereof will be omitted.

FIG. 8 shows an internal configuration example of the first camera system 71.

The camera block 2 includes a first display signal processing unit 81 that performs gamma processing or the like on the picture signals supplied from the signal processing unit 24 and interlace-outputs them. The picture signals output by the first display signal processing unit 81 are sent to the display device 75 via the external interface unit 30.

The display device 75 includes an external interface unit 82 that receives picture signals from the imaging apparatus 10 and sends a control signal to the imaging apparatus 10. Further, the display device 75 includes a second display signal processing unit 83 that switches normal display or clipping display of the picture to be output to the display unit 3 according to a command of switching the first or second display mode by the display mode switching unit 4. The second display signal processing unit 83 functions as a picture signal processing circuit, and the first or second picture signals output by the second display signal processing unit 83 are supplied to the display unit 3 and pictures are displayed.

[Internal Configuration Example of Second Display Signal Processing Unit]

Figure 9:
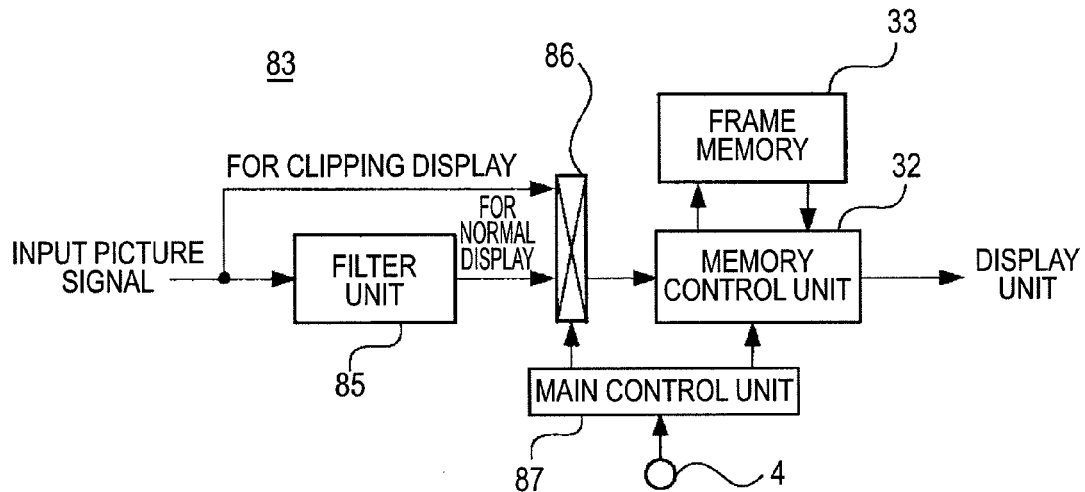
FIG. 9 is a block diagram showing an internal configuration example of a display signal processing unit according to the second embodiment of the invention.

FIG. 9 shows an internal configuration example of the second display signal processing unit 83.

The second display signal processing unit 83 includes a filter unit 85 that performs predetermined filter processing on the first picture signals input from the signal processing unit 24. Further, the unit includes a selection unit 86 that selects and outputs the second picture signals for normal display supplied from the filter unit 85 or the first picture signals for clipping display supplied from the external interface unit 82 according to a command of switching the first or second display mode to the memory control unit 32. Further, the second display signal processing unit 83 includes a main control unit 87 that controls the operation of the filter unit 85 and the memory control unit 32.

The second display signal processing unit 83 in this example branches the picture signals before filter processing and supplies them for clipping display to the selection unit 86 in the case of normal display. The selection unit 86 supplies the second picture signals output from the filter unit 85 to the memory control unit 32 in the first display mode according to the first or second display mode commanded to be switched by the display mode switching unit 4 via the main control unit 87. On the other hand, in the second display mode, the unit supplies the first picture signals without change to the memory control unit 32. Thereby, as shown in FIGS. 6A to 6F, the display of the picture displayed on the display unit 3 can be switched between normal display and clipping display.

According to the camera system according to the above described third embodiment, the user presses down the display mode switching unit 4 provided in the imaging apparatus 10 main body, the display device 75, the relay device 76, the control device 77, or the like, and provides a command of switching of the display mode from normal display to clipping display. Thereby, the picture displayed on the display unit 3 is displayed in clipping display.

Here, if the imaging apparatus 10 has an imaging function, whether there is a peripheral device and a peripheral function other than the display device such as the presence or absence of a recording device, the presence or absence of a transmission device is not considered. Further, the display signal processing unit (the second display signal processing unit 83 in this example) that changes the picture signals output according to normal display or clipping display is contained in at least one of the imaging apparatus 10, the display device 75, the relay device 76, and the control device 77. Thereby, regardless of the location where the display device 75 is provided, the pictures can be displayed by switching the display between normal display and clipping display.

Note that the first camera system 71 may include the display signal processing unit 28 according to the above described first embodiment. Further, the internal configuration of the filter unit 85 of the second display signal processing unit 83 may employ either of the configurations of the filter units 31, 31' according to the first embodiment.

4. Modified Example

In the above described third embodiment, the display device 75 includes the second display signal processing unit 83 for normal display or clipping display of pictures. However, the first camera system 71 to the third camera system 73 according to the above described second embodiment may include the second display signal processing unit 83.

Further, the case where the picture in 1920×1080 size imaged by the imaging apparatus 10 is displayed on the display unit 3 in 960×540 size has been described, however, a picture imaged in another picture size may be displayed on a display unit in another picture size. Furthermore, the ratio of the picture size of the picture imaged by the imaging apparatus 10 to the picture size of the picture displayed on the display unit 3 is not limited to 4:1, but may be various ratios.

Moreover, the number of clocks delayed by the delay part 41 of the filter units 31, 31' is not limited to one clock. Accordingly, the number of clocks can be changed according to the configuration of the display signal processing unit.

Further, a series of processing in the above described embodiments may be executed by hardware or executed by software. When the series of processing is executed by software, a program configuring the software may be installed in a computer incorporated in special hardware, or various programs may be installed. Thereby, a program configuring desired software is installed and executed in a general-purpose computer, for example, that can execute various functions.

Furthermore, the functions are realized by supplying a recording medium in which program codes of software for realizing the functions of the above described embodiments to a system or an apparatus. Moreover, it is obvious that the functions are realized by a computer (or a control device such as a CPU) of the system or the apparatus reading out the program codes stored in the recording medium.

As the recording medium for supplying the program codes, for example, a floppy disk, a hard disk, an optical disk, a CD-ROM, a CD-R, a magnetic tape, a nonvolatile memory card, a ROM, or the like may be used.

Moreover, not only the functions of the above described embodiments are realized by executing the program codes read out by the computer but also an OS in operation on the computer or the like may perform part or all of the actual processing based on the command of the program codes. Here, the case where the functions of the above described embodiments are realized by the processing may be included.

In addition, it is obvious that the invention is not limited to the above described embodiments and various other configurations can be adopted without departing from the scope of the invention.

The present application contains subject matter related to that disclosed in Japanese Priority Patent Application JP 2008-294878 filed in the Japan Patent Office on Nov. 18, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A picture signal processing circuit comprising:
a filter unit, when, based on first picture signals supplied from an imaging device that images a subject in a first picture size determined by a first number of pixels, a first or second display mode for display of a picture on a display unit having a picture size determined by a second number of pixels smaller than the first number of pixels is set, that outputs second picture signals obtained by performing filter processing of removing high-frequency components from the first picture signals in the first display mode and outputs the first picture signals without change in the second display mode;
a memory control unit that allows a memory to store the first or second picture signals supplied from the filter unit, and reads out the second picture signals from the memory, performs processing of reducing from the first picture size to the second picture size on the second picture signals, and output the signals to the display unit in the first display mode, and reads out the first picture signals corresponding to a picture clipped in the second picture size from the picture in the first picture size from the memory and outputs the signals to the display unit in the second display mode; and
a main control unit that controls switching between the first and second picture signals filter-processed or read out from the memory by the memory control unit according to a command of switching between the first and second display modes provided by a display mode switching unit that provides the command of switching between the first and second display modes.

2. The picture signal processing circuit according to claim 1, further comprising a selection unit, according to the first or second display mode commanded to be switched by the display mode switching unit via the main control unit, that supplies the second picture signals output from the filter unit to the memory control unit in the first display mode and supplies the first picture signals to the memory control unit in the second display mode.

3. The picture signal processing circuit according to claim 2, wherein the memory control unit reads out the first picture signals corresponding to the picture clipped in the second picture size from the picture in the first picture size while superimposing a center point of a horizontal line and a vertical line of the second picture size on a center point of a horizontal line and a vertical line of the first picture size when a command of switching from the first display mode to the second display mode is provided by the display mode switching unit.

4. The picture signal processing circuit according to claim 3, wherein the memory control unit changes a position of the picture clipped in the second picture size from the picture in the first picture size at each time when a command of switching the picture is performed by the display mode switching unit in the second display mode, and switches from the second display mode to the first display mode when the picture clipped in the second picture size thoroughly clips the picture in the first picture size.

5. The picture signal processing circuit according to claim 4, wherein the display mode switching unit provides a command of switching from the first display mode to the second display mode or switching a picture clipped in the second display mode to the main control unit if pushed and held in a predetermined time, and provides a command of switching from the second display mode to the first display mode to the main control unit if pushed in a time less than the predetermined time.

6. The picture signal processing circuit according to claim 5, wherein the filter unit includes
first and second paths for transmission of the first picture signals, and
an addition part in which the first picture signals transmitted from the first and second paths,
in the second path,
a delay part that delays and outputs the first picture signals by a predetermined number of clocks, and a switch that controls output of the first picture signals delayed by the predetermined number of clocks are provided, and
the addition part outputs the second picture signals obtained by adding the first picture signals transmitted through the first path and the first picture signals delayed by the predetermined number of clocks via the delay part to the memory control unit when the switch is on, and outputs only the first picture signals transmitted through the first path to the memory control unit when the switch is off.

7. The picture signal processing circuit according to claim 5, wherein the filter unit includes
first and second paths for transmission of the first picture signals, and
an addition part in which the first picture signals transmitted from the first and second paths are added,
in the first path,
a switch that controls output of the first picture signals is provided,
in the second path,
a delay part that delays and outputs the first picture signals by a predetermined number of clocks is provided, and
the addition part outputs the second picture signals obtained by adding the first picture signals transmitted through the first path and the first picture signals delayed by the predetermined number of clocks via the delay part to the memory control unit when the switch is on, and outputs only the first picture signals delayed by the predetermined number of clocks via the delay part to the memory control unit when the switch is off.

8. A picture signal processing method comprising the steps of:
when, based on first picture signals supplied from an imaging device that images a subject in the first picture size determined by a first number of pixels, a first or second display mode for display of a picture on a display unit having a picture size determined by a second number of pixels smaller than the first number of pixels is set, outputting second picture signals obtained by performing filter processing of removing high-frequency components from the first picture signals in the first display mode and outputting the first picture signals without change in the second display mode;
allowing a memory to store the first or second picture signals, and reading out the second picture signals from the memory, performing processing of reducing from the first picture size to the second picture size on the second picture signals, and outputting the signals to the display unit in the first display mode, and reading out the first picture signals corresponding to a picture clipped in the second picture size from the picture in the first picture size from the memory and outputting the signals to the display unit in the second display mode; and
controlling switching between the first and second picture signals filter-processed or read out from the memory according to a command of switching between the first and second display modes provided by a display mode switching unit that provides the command of switching between the first and second display modes.

9. An imaging apparatus comprising:
a filter unit, when, based on first picture signals supplied from an imaging device that images a subject in the first picture size determined by a first number of pixels, a first or second display mode for display of a picture on a display unit having a picture size determined by a second number of pixels smaller than the first number of pixels is set, that outputs second picture signals obtained by performing filter processing of removing high-frequency components from the first picture signals in the first display mode and outputs the first picture signals without change in the second display mode;
a memory control unit that allows a memory to store the first or second picture signals supplied from the filter unit, and reads out the second picture signals from the memory, performs processing of reducing from the first picture size to the second picture size on the second picture signals, and output the signals to the display unit in the first display mode, and reads out the first picture signals corresponding to a picture clipped in the second picture size from the picture in the first picture size from the memory and outputs the signals to the display unit in the second display mode;
a display mode switching unit that provides a command of switching between the first and second display modes; and
a main control unit that controls switching between the first and second picture signals filter-processed or read out from the memory by the memory control unit according to a command of switching between the first and second display modes provided by a display mode switching unit that provides the command of switching between the first and second display modes.

10. A display device comprising:
a display unit that displays a picture;

a filter unit, when, based on first picture signals supplied from an imaging device that images a subject in the first picture size determined by a first number of pixels, a first or second display mode for display of a picture on the display unit having a picture size determined by a second number of pixels smaller than the first number of pixels is set, that outputs second picture signals obtained by performing filter processing of removing high-frequency components from the first picture signals in the first display mode and outputs the first picture signals without change in the second display mode;

a memory control unit that allows a memory to store the first or second picture signals supplied from the filter unit, and reads out the second picture signals from the memory, performs processing of reducing from the first picture size to the second picture size on the second picture signals, and output the signals to the display unit in the first display mode, and reads out the first picture signals corresponding to a picture clipped in the second picture size from the picture in the first picture size from the memory and outputs the signals to the display unit in the second display mode;

a display mode switching unit that provides a command of switching between the first and second display modes; and a main control unit that controls switching between the first and second picture signals filter-processed or read out from the memory by the memory control unit according to the command of switching between the first and second display modes provided by the display mode switching unit.

11. A camera system comprising:

an imaging apparatus including an imaging device that images a subject in a first picture size determined by a first number of pixels;

a display device that displays a picture in a picture size determined by a second number of pixels smaller than the first number of pixels;

a filter unit, when, based on first picture signals supplied from the imaging apparatus, a first or second display mode for display of a picture on the display unit is set, that outputs second picture signals obtained by performing filter processing of removing high-frequency components from the first picture signals in the first display mode and outputs the first picture signals without change in the second display mode;

a memory control unit that allows a memory to store the first or second picture signals supplied from the filter unit, and reads out the second picture signals from the memory, performs processing of reducing from the first picture size to the second picture size on the second picture signals, and output the signals to the display unit in the first display mode, and reads out the first picture signals corresponding to a picture clipped in the second picture size from the picture in the first picture size from the memory and outputs the signals to the display unit in the second display mode; and a relay device including a main control unit that controls switching between the first and second picture signals filter-processed or read out from the memory by the memory control unit according to a command of switching between the first and second display modes provided by a display mode switching unit that provides the command of switching between the first and second display modes.

12. The camera system according to claim 11, further comprising the display mode switching unit and a control unit that controls an operation of the imaging apparatus.

\* \* \* \* \*